US010994337B2

(12) United States Patent
Khairallah et al.

(10) Patent No.: US 10,994,337 B2
(45) Date of Patent: May 4, 2021

(54) CONTROLLING AM SPATTER AND CONDUCTION

(71) Applicant: LAWRENCE LIVERMORE NATIONAL SECURITY, LLC, Livermore, CA (US)

(72) Inventors: Saad A. Khairallah, Livermore, CA (US); Gabe Guss, Manteca, CA (US); Wayne E. King, Danville, CA (US); Sonny S. Ly, Mountain House, CA (US); Manyalibo Joseph Matthews, Livermore, CA (US); Alexander M. Rubenchik, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 50 days.

(21) Appl. No.: 16/217,351

(22) Filed: Dec. 12, 2018

(65) Prior Publication Data
US 2020/0189183 A1 Jun. 18, 2020

(51) Int. Cl.
| | | |
|---|---|---|
| B22F 10/368 | (2021.01) | |
| B29C 64/153 | (2017.01) | |
| B23K 26/00 | (2014.01) | |
| B23K 26/342 | (2014.01) | |
| B29C 64/20 | (2017.01) | |
| B23K 26/062 | (2014.01) | |
| B23K 26/073 | (2006.01) | |
| B23K 26/06 | (2014.01) | |
| B29C 64/393 | (2017.01) | |
| B22F 10/85 | (2021.01) | |

(52) U.S. Cl.
CPC ............ *B22F 10/368* (2021.01); *B22F 10/85* (2021.01); *B23K 26/0006* (2013.01); *B23K 26/062* (2015.10); *B23K 26/0608* (2013.01); *B23K 26/073* (2013.01); *B23K 26/342* (2015.10); *B29C 64/153* (2017.08); *B29C 64/20* (2017.08); *B29C 64/393* (2017.08)

(58) Field of Classification Search
None
See application file for complete search history.

(56) References Cited

U.S. PATENT DOCUMENTS

| | | | | |
|---|---|---|---|---|
| 5,393,482 | A * | 2/1995 | Benda | B22F 3/1055 419/1 |
| 5,427,733 | A * | 6/1995 | Benda | B22F 3/1055 419/1 |
| 9,919,360 | B2 * | 3/2018 | Buller | B23K 15/0013 |
| 2017/0087634 | A1 * | 3/2017 | Beacham, Jr. | B22F 3/1055 |

(Continued)

OTHER PUBLICATIONS

Boley, et al., "Modeling of laser interactions with composite materials," Appl. Opt. 52, 14, (2013) 3329-3337.

(Continued)

*Primary Examiner* — Joseph S Del Sole
*Assistant Examiner* — Manley L Cummins, IV
(74) *Attorney, Agent, or Firm* — Eddie E. Scott

(57) ABSTRACT

An intelligent feed forward model to control additive manufacturing (AM) laser powder bed fusion process and reduce spattering whereby defects are eliminated by controlling the laser power and reducing spattering through a computer model. This application describes using a proportional integral derivative (PID) controller to create a power map that reduces spattering.

4 Claims, 9 Drawing Sheets

(56) References Cited

U.S. PATENT DOCUMENTS

2017/0106593 A1* 4/2017 Khairallah ......... B23K 26/0622
2017/0239719 A1* 8/2017 Buller .................. B22F 3/1055

OTHER PUBLICATIONS

Fabbro, et al, "Dynamical description of the keyhole in deep penetration laser welding," J. Laser Appl. 12 (2000) 142-148. doi:10.1351/1.521924.

He, et al., "Liquid metal expulsion during laser spot welding of 304 stainless steel," J. Phys. Appl. D: Phys. 39 (2006) 525-534.

Kaplan, et al., "Spatter in laser welding," J. Laser Appl. 23, 5, (2011) 032005-1-032005-7. doi:10.2351/1.3597830.

Khairallah, et al., "Mesoscopic simulation model of selective laser melting of stainless steel powder," J. Mater. Process. Technol. 214 (2014) 2627-2636.

Liu et al., Investigation into spatter behavior during selective laser melting of AISI 316L stainless steel powder, Mater. Des. 87 (2015) 797-806.

Matsunawa, et al., "The simulation of front keyhole wall dynamics during laser welding," J. Phys. D: Appl. Phys. 30 (1997) 798-809. doi:10.1088/0022-3727/30/5/013.

Matthews, et al, "Denudation of metal powder layers in laser powder bed fusion processes," Acta Mater. 114 (2016) 33-42. doi:10.1016/factamat.2016.05.017.

McCallen, "ALE3D: Arbitrary Lagrange Eulerian Three-and Two Dimensional Modeling and Simulation Capability," LLNL-ABS-565212 (Lawrence Livermore National Laboratory, Livermore, CA), 2012, 1-3.

Nakamura, et al., "Elucidation of melt flows and spatter formation mechanisms during high power laser welding of pure titanium," J. Laser Appl. 27, 3, (2015) 032012-1-032012-10.

Qiu, et al. "On the role of melt flow into the surface structure and porosity development during selective laser melting," Acta Mater. 96 (2015) 72-79.

Simonelli et al, "A Study on the Laser Spatter and the Oxidation Reactions During Selective Laser Melting of 316L Stainless Steel," Al—Si10—Mg, and Ti—6Al—4V, Metall. Mater. Trans. A. 46 (2015) 3842-3851.

* cited by examiner

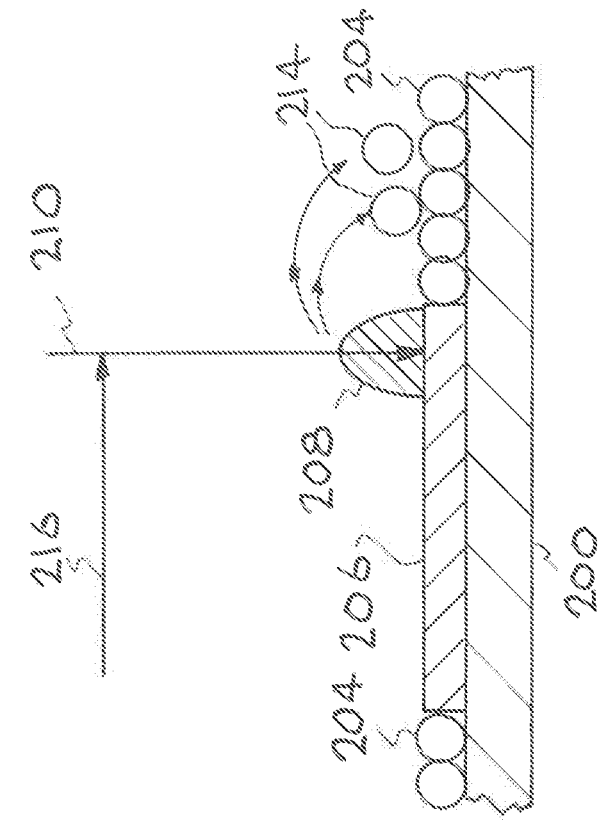
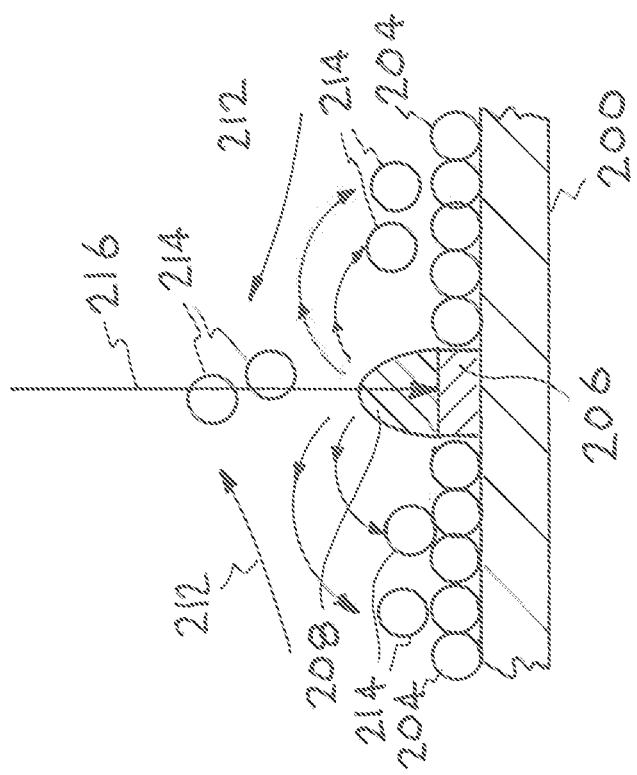

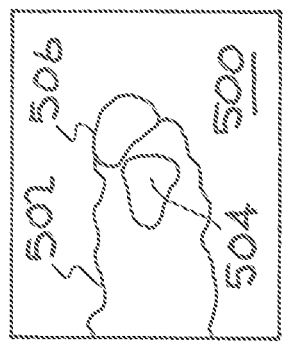
FIG.5C
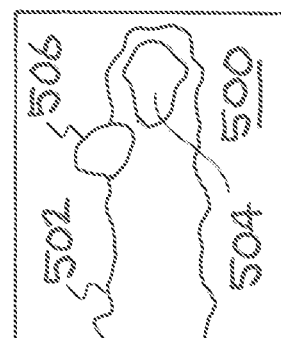
FIG.5F
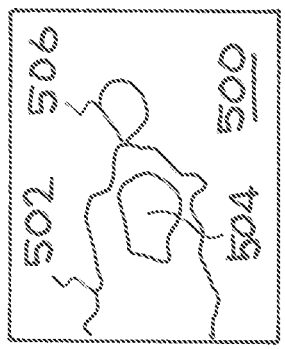
FIG.5B
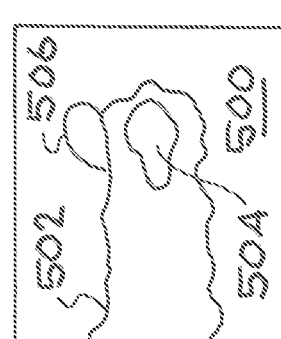
FIG.5E
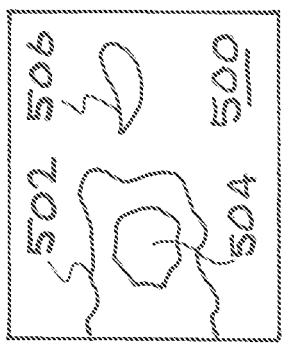
FIG.5A
FIG.5D

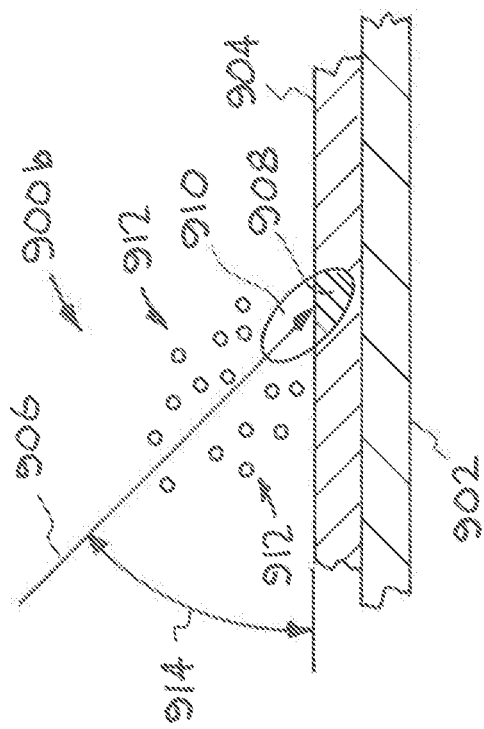
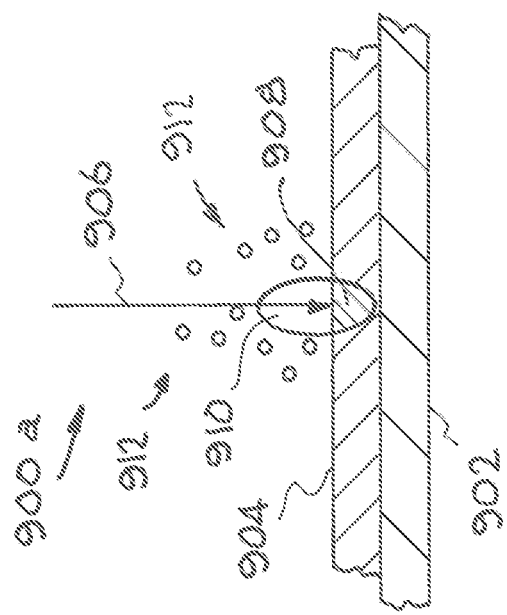

CONTROLLING AM SPATTER AND CONDUCTION

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

CROSS-REFERENCE TO RELATED APPLICATIONS

This application claims priority to and benefit under 35 U.S.C. § 119(e) of U.S. Provisional Patent Application No. 62/647,375 filed Mar. 23, 2018 entitled "additive manufacturing power map to mitigate defects," the content of which is hereby incorporated by reference in its entirety for all purposes.

BACKGROUND

Field of Endeavor

The present application relates to additive manufacturing and more particularly to an additive manufacturing (AM) power map for controlling AM spatter and conduction.

State of Technology

This section provides background information related to the present disclosure which is not necessarily prior art.

Any high speed video on selective laser melting (SLM) for additive manufacturing (AM) processes will show bright sparks accompanied by the movement of the laser beam. These sparks are droplets ejected from the melt pool as spatter, and can be a source of problem for AM. Spatter reduces the amount of material in the melt pool and can cause voids, increase porosity, produce surface roughness, and change the composition of the recycled powder. All of these can affect the physical and mechanical properties of the build. A thorough understanding of spatter formation and behavior for different materials is important to predict layer quality, morphology, and density of the final part.

To understand the potential effects of spattering on SLM processes, it is necessary to understand the mechanism of material expulsion from a melt pool created from a metallic powder bed. Spattering have been investigated thoroughly in welding processes, however studies relating to SLM for AM processes have only been carried out in recent years. Certain aspects of the spattering process for welding and SLM are similar, but there are importance differences to point out. Welding—a joining process—typically use a high energy density laser with a large spot size, to melt a deep channel of a few millimeters on a bare metal plate. On the other hand, for SLM a deposition process—a powder bed is used instead, with a relatively small laser beam (50-500 μm) and the melt depth is usually tens of microns. The larger melt pool found in welding leads to different melt flow dynamics and spattering physics. For an example, the surface tension in welding is not very important, whereas it plays a significant role in the spattering mechanism in SLM.

The inventors recently demonstrated that in SLM, there exist an additional mechanism that can lead to spattering. A vapor jet ejected from the melt pool can pull in the surrounding gas and entrain the powder particles from outside the laser beam. These particles can be accelerated by the vapor jet towards the melt pool and will be subject to at least three main final outcomes: (1) travel towards and along the vapor jet but missing the laser beam and ejected as cold particles, (2) travel into the melt pool and become subsumed and (3) travel towards and along the vapor jet, intersecting the laser beam, rapidly heating up and ejected as a hot particle that is observed on the macroscopic scale as spatter. Because the details of the fluid dynamics and other physics involved at the microscale was not fully understood until revealed in, it is important to revisit macroscale observables such as spatter with the new physics in mind.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed a laser powder bed fusion additive manufacturing system for reducing spattering by creating a power map that is an intelligent feed forward model to control the laser powder bed fusion additive manufacturing for producing a part or product and using the power map to control the laser powder bed fusion additive manufacturing for producing the part or product.

The inventors' apparatus, systems, and methods provide an intelligent feed forward model to control additive manufacturing (AM) laser powder bed fusion process, whereby, defects are eliminated by controlling the laser power through a computer model. This application describes using a proportional integral derivative (PID) controller to create a power map.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 2A and 2B are illustrations showing how spattering can occur as the laser beams travels over the powder bed.

FIGS. 5A, 5B, 5C, 5D, 5E and 5F are simulations depict spattering.

FIGS. 9A and 9B are additional illustrations showing examples of how spattering can occur as the laser beams travels over the powder bed.

DETAILED DESCRIPTION OF SPECIFIC EMBODIMENTS

Figure 1:
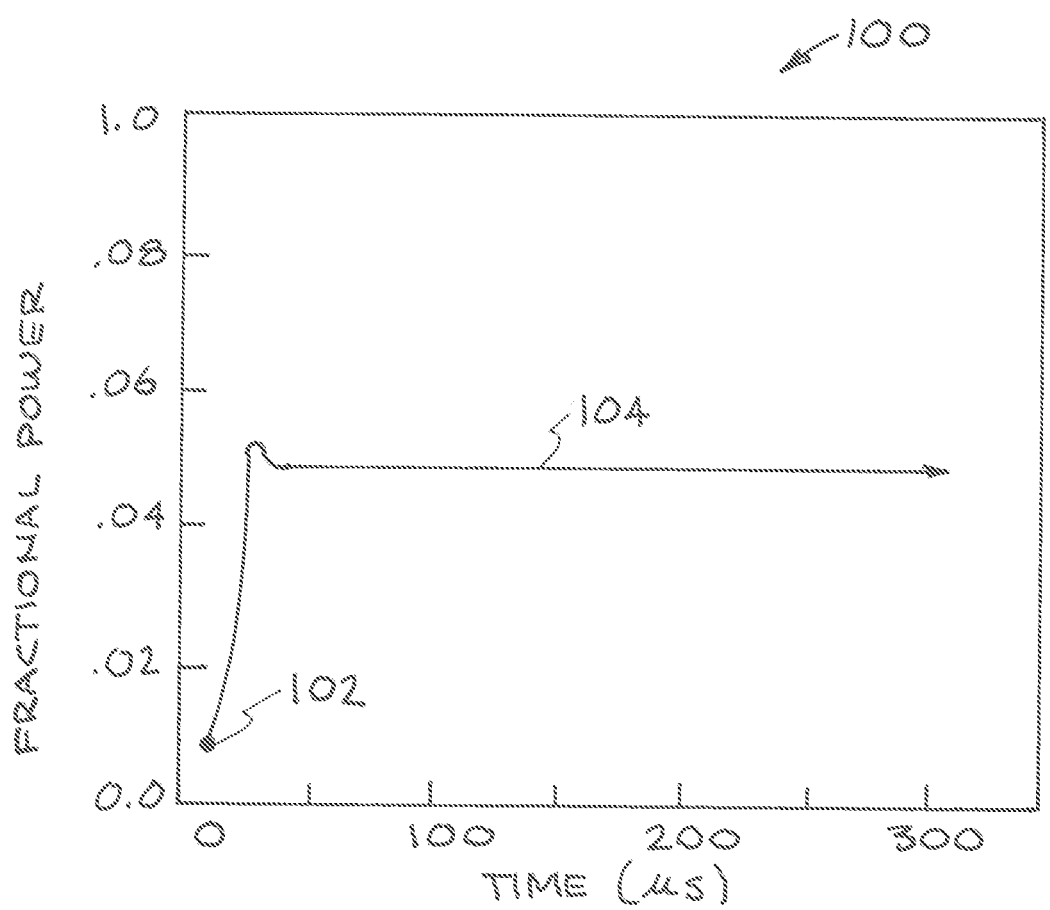
FIG. 1 is a laser power curve that shows ramping up gently to help prevent and/or reduce spattering.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have developed a process based on the knowledge that the direction of the metal vapor plume observed during a powder bed based Additive Manufacturing (AM) process indicates how close is the AM process to the undesirable keyhole regime and also powder spatter. Using a combination of in-situ plume angle measurement, surrogate modeling and controlling the laser power or speed, the powder plume's direction can help control the melt pool depth, i.e. melt pool morphology under the laser, as well as the spatter direction and prevent keyholes and keyhole pores. In various embodiments the inventor's processes utilize a set of enabling tools summarized below.

Step 1—Ability to observe the metal vapor plume in the AM machine, and measure the angle of the plume relative to the powder bed plane.

Step 2—Relate the melt plume direction to the actual melt pool depth. To perform step 2, one can use a pre-computed database of melt depth versus power and scan speed. This can be built using high fidelity simulations or reduced order models or simply an experimental database that relates power and scan speed to melt pool depth and the angle of the indentation under the laser/electric beam.

Step 3—Once a relation is made between the measured vapor plume angle to the melt pool depth for a given laser power and scan speed, decide if the resulting depth is advantageous to the AM build. For example, the requirement could be that the melt pool should not be deep in the keyhole regime, nor far away in the weak conduction regime. The depth should be a little bit more than the powder thickness, penetrating enough to fuse the layers. This step can be automated and incorporated into a closed loop/PID controller process, so as the melt depth is controlled by controlling laser power and scan speed which in turn control the plume direction.

By surrogate model, Applicants mean some computationally fast model that can give good estimates of melt depth. The model can be based on a database, that connects the melt pool depth with the applied power, given a laser speed. This relationship is known to be linear. The database can be assembled by doing a parameter study varying power and scan speed and measuring the melt pool depth. For a given scan speed, the melt depth can be measured experimentally or modeled using a high fidelity model, for two given powers. That should be enough due to the linear relationship between power and depth. Other deterministic models include but are not limited to Eager Tsai model, a finite element continuum calculation that uses heat conduction only, a discrete element method based model. One would compute the normal direction to the melt line below the laser. The normal gives the direction of the plume. The model can also be statistical based using Gaussian processes to build a response surface. Also, for visualizing the plume, a trained computer vision machine learning model based for instance on neural network could be used to associate the plume direction with favorable or unfavorable conditions as determined by melt pool depth requirement.

The inventors have developed an additive manufacturing (AM) power map for a powder bed fusion system that reduces spattering. The power map describes desired laser power changes to reduce spattering as the laser moves along a path. When the power map is adopted by an AM machine, the laser power is changed appropriately to prevent spattering and defects caused by spattering. Referring now to the drawings, Applicants' in FIGS. 2A & B thru FIGS. 5A-5F, will describe and illustrate problems from spattering that may occur during the making of a product by the AM process. Applicants' in FIG. 1 and FIGS. 6A &B thru FIGS. 8A & B, will describe various embodiments of Applicant's apparatus, systems, and methods. In FIG. 1 a graph 100 visually illustrates laser power versus time as the laser moves along a path in an AM machine. The FIG. 1 a graph 100 visually illustrates laser power vs time as the laser solidifies metal powder to produce the product or part. The graph 100 shows laser power versus time as the laser beam moves along a predetermined path in an AM machine. The graph 100 shows a point 102 that is the start of the laser beam path.

In FIG. 1 the laser power curve is shown ramping up gently in the portion of the path from the start point 102 to help prevent and/or reduce spattering. Application of too much power at the start tends to create spatter. This is one application of the PID controller. In this case, a tracer point is moved from the surface to below the substrate. By requesting the temperature variable at that point to be equal to melting temperature, the PID controller will control the power to achieve this end. By requiring a gently dive from the tracer into the substrate, the power is increased gently until a user specific input melt depth is achieved.

The graph 100 then shows the laser power rising to a power level 104 that will be maintained as the laser travels over the powder bed. The laser is shown being at a relative constant power in order to produce a constant melt depth in the straight line path 104. This is achieved by moving the fictitious tracer point along the path of the laser at a user input melt depth and requiring the temperature at that tracer point to be of a certain fixed value equal to melt temperature.

Referring to FIGS. 2A and 2B, illustrations show how spattering can occur as the laser beams travels over the powder bed. FIG. 2A is a cross sectional end view. FIG. 2B is a sectional side view. The components of FIGS. 2A and 2B are listed below.

200 substrate/build platform,
204 powder bed,
206 melt pool,
208 plume,
210 laser beam,
212 gas flow,
214 ejected particles, and
216 laser beam path.

FIG. 2A shows that the ejected (spattered) particles 214 can fall to the sides contaminating other parts of the powder bed 204 such as parts of the powder bed that are not to be used in the object being constructed, making that powder non-recoverable. FIG. 2A shows also that particles can also enter the laser beam 210 altering the beams performance. FIG. 2B shows that the spattered particles 214 can also be thrown forward of the beams path 216 causing defects in the object being constructed.

Figure 3:
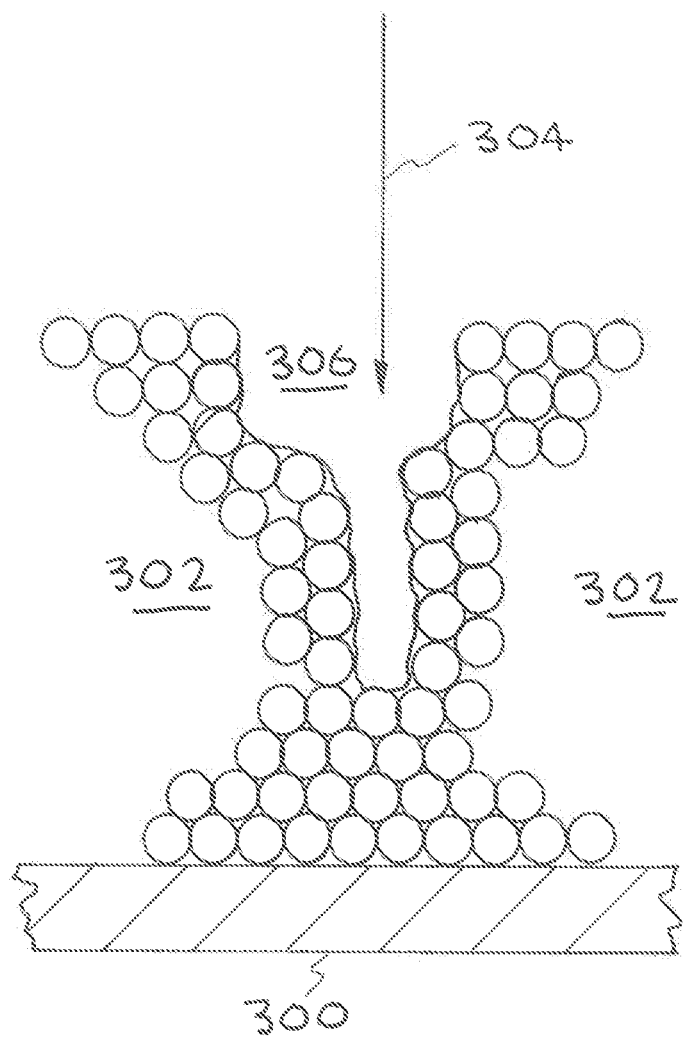
FIG. 3 is an illustration showing a keyhole defect.

Referring to FIG. 3, an illustration shows a keyhole defect.

The components of FIG. 3 are listed below.
300 substrate/build platform,
302 powder bed,
304 laser beam, and
306 "key hole" defect.

FIG. 3 shows that when the laser beam 304 changes direction the beam will dwell for a short time at one point causing too much energy to be concentrated at that point. This can result in pore/defects being formed. One of the defects is shown here as having a "key hole" shape 306.

Referring to FIGS. 4A, 4B, 4C, 4D, 4E and 4F; simulations depict spattering. The components of FIGS. 4A, 4B, 4C, 4D, 4E and 4F are listed below.
400 powder bed,
402 melt path,
404 melt pool, and
406 spatter.

Figure 4A:
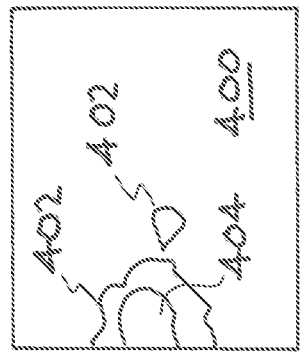
FIGS. 4A, 4B, 4C, 4D, 4E and 4F are simulations depict spattering.
Figure 4B:
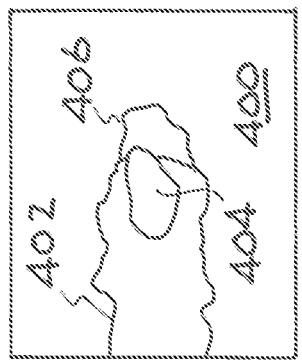
Figure 4C:
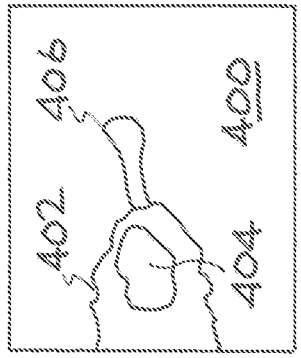
Figure 4D:
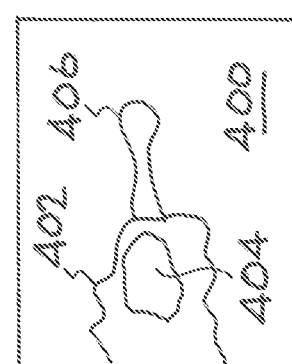
Figure 4E:
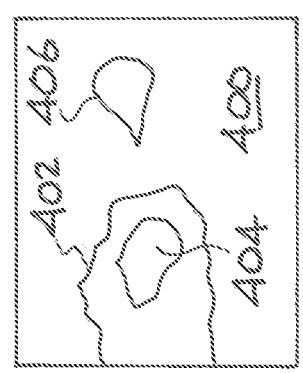
Figure 4F:
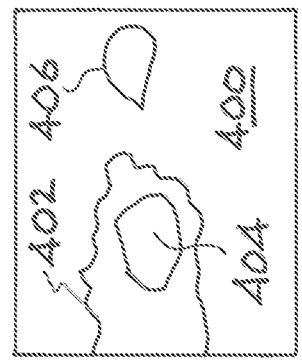

FIG. 4A shows spatter forming. FIG. 4B shows spatter on front of melt. FIG. 4C shows spatter breaking away further from melt. FIG. 4D shows spatter broken free from the melt. FIG. 4E shows spatter ahead of the melt.

Referring to FIGS. 5A, 58, 5C, 5D, 5E and 5F; simulations depict spattering. The components of FIGS. 5A, 5B, 5C, 5D, 5E and 5F are listed below.
500 powder bed,
502 melt path,
504 melt pool, and
506 spatter.

FIG. 5A shows patter separated from melt path. FIG. 5B shows spatter becoming attached to melt path. FIG. 5C shows spatter becoming further attached to melt path. FIG. 5D shows spatter starting to be absorbed in melt path. FIG. 5E shows further absorption. FIG. 5F shows spatter a part of melt path.

Figure 6A:
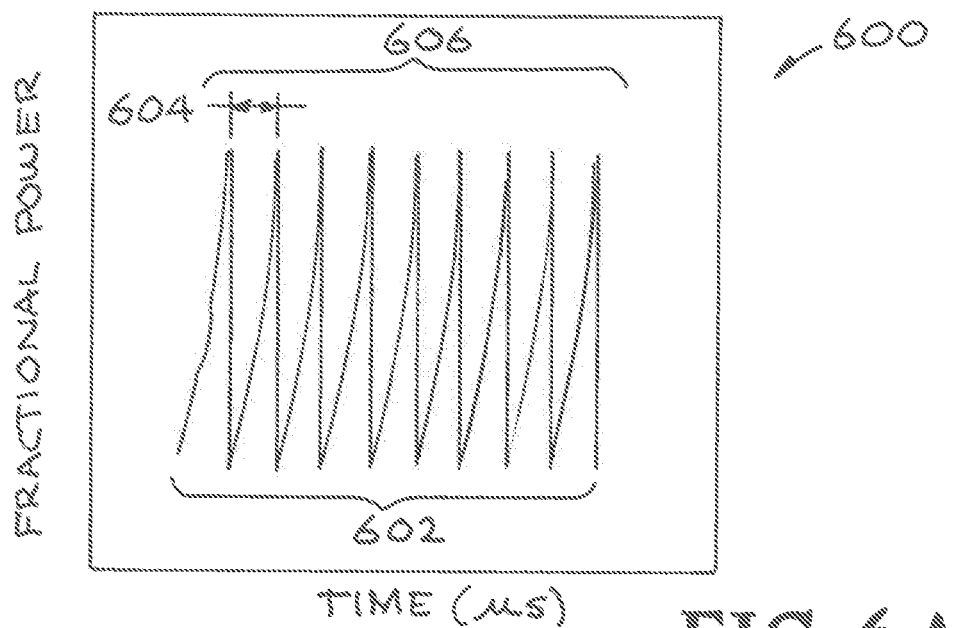
FIGS. 6A and 6B are illustrations showing a first embodiment of Applicant's apparatus, systems, and methods.
Figure 6B:
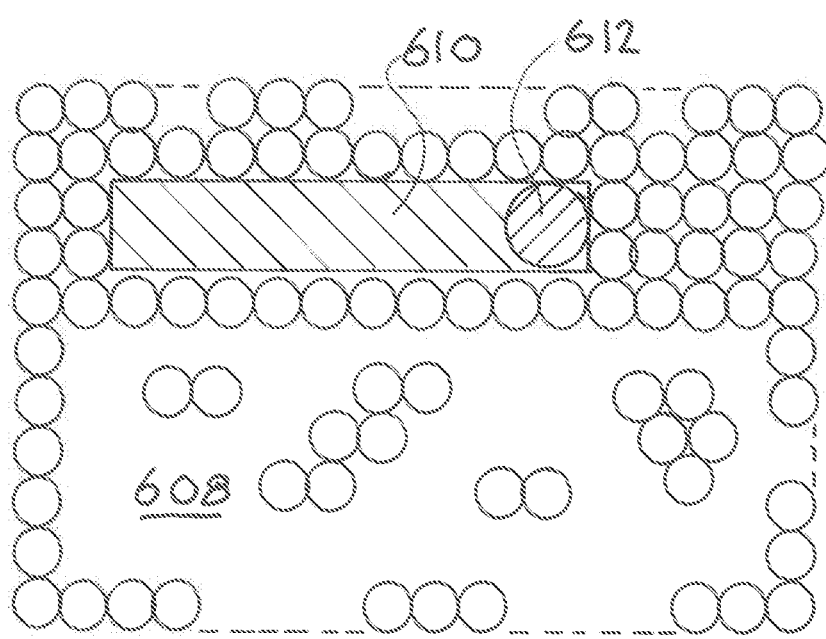

Referring to FIGS. 6A and 6B, illustrations show a first embodiment of Applicant's apparatus, systems, and methods. FIG. 6A is a graph 600 that visually illustrates how the laser beam is applied to the powder bed 608 of FIG. 6B. In the graph 600 the laser beam is shown starting at a low power 602 that will partially melt the power and after a short interval 604 controlled by the power mapping system full melt power 606 will be reached. This process will be repeated many times as the laser beam 612 proceeds on its predetermined melt path 610.

Figure 7A:
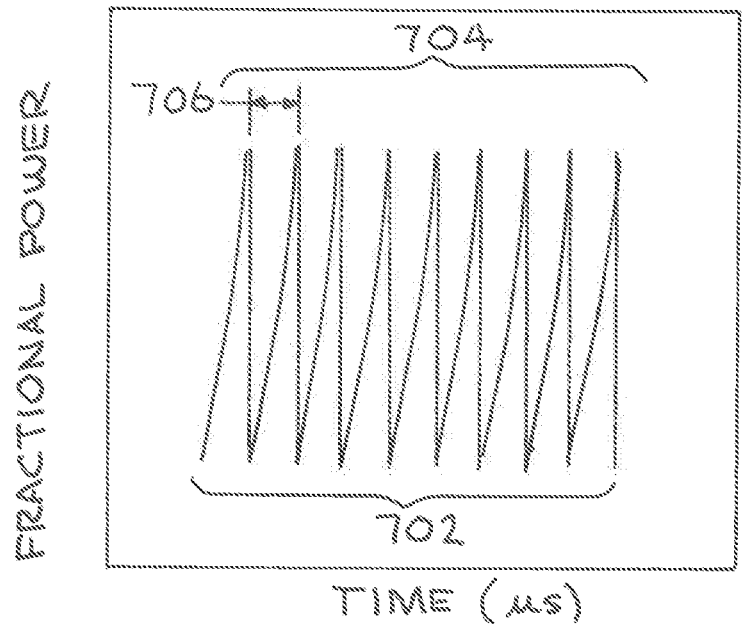
FIGS. 7A and 7B are illustrations showing a second embodiment of Applicant's apparatus, systems, and methods.
Figure 7B:
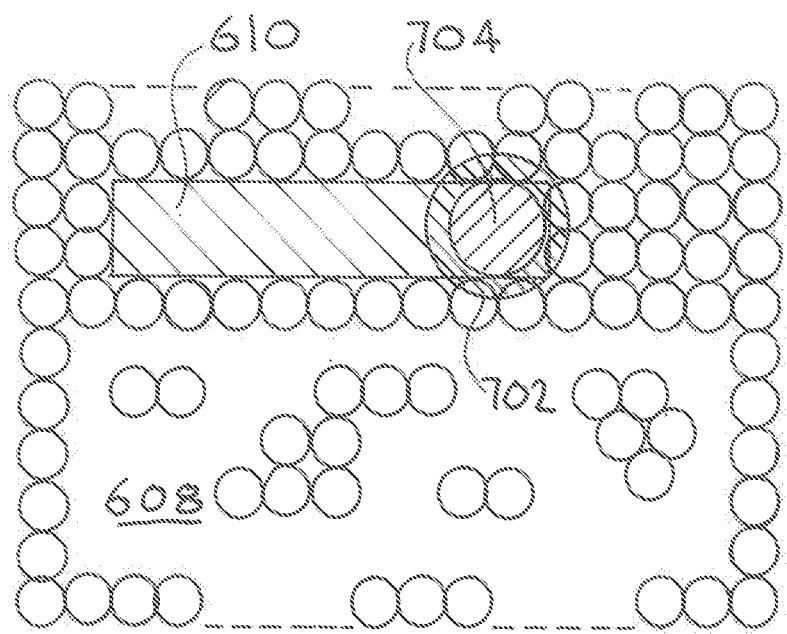

Referring to FIGS. 7A and 7B, illustrations show a second embodiment of Applicant's apparatus, systems, and methods. FIG. 7A is a graph that visually illustrates how the laser beam is applied to the powder bed 608 of FIG. 71. The laser beam 702 is first focused as a low power larger spot 702 that will partially melt the powder bed 608 of FIG. 7B. The laser then changes focus to a smaller high power beam 704 to complete the melt. This process is repeated, again and again as the laser moves at some determined interval 706 along the melt path 610.

Figure 8A:
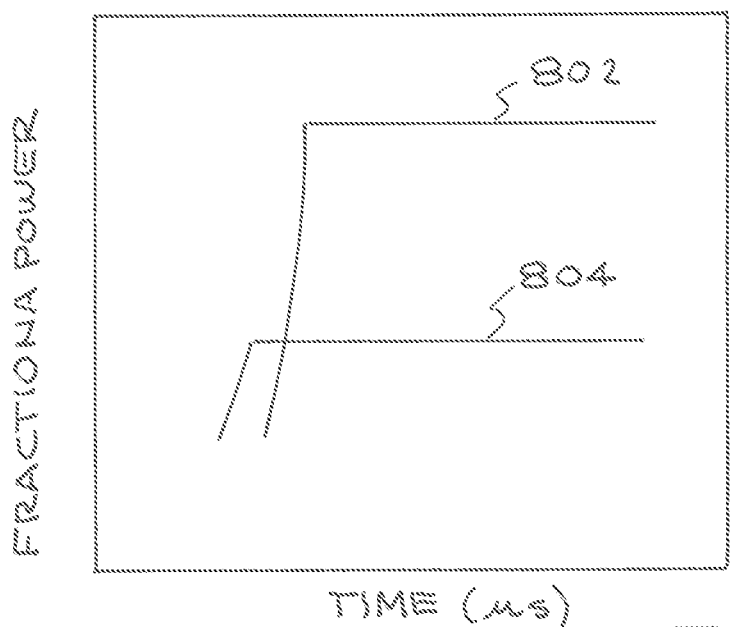
FIGS. 8A and 8B are illustrations showing a third embodiment of Applicant's apparatus, systems, and methods.
Figure 8B:
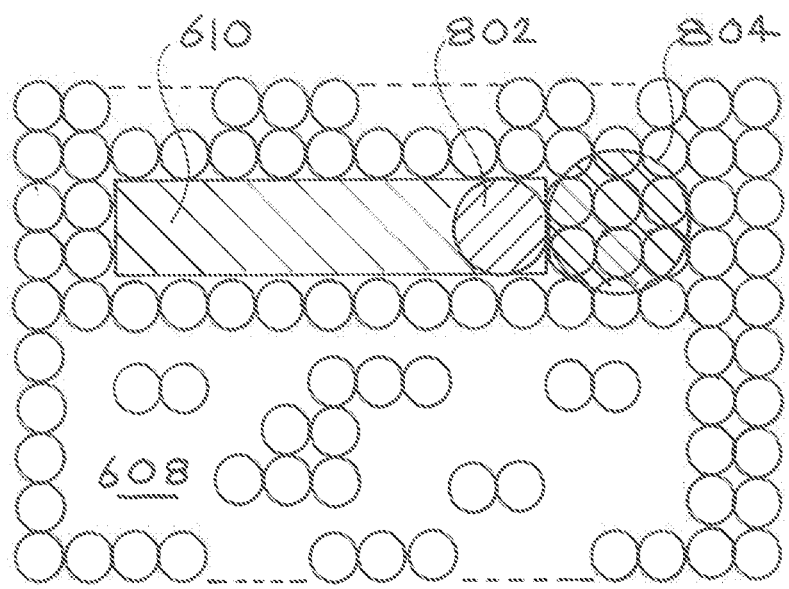

Referring to FIGS. 8A and 8B, illustrations show a third embodiment of Applicant's apparatus, systems, and methods. FIG. 8A is a graph that visually illustrates how the laser beam is applied to the powder bed 608 of FIG. 8B. In this embodiment two discrete lasers are used. The first laser is a larger, low power beam 804 that will partially melt the powder bed 608. The second laser is smaller beam 802 at a power level that will complete the melt. The two laser beams will move along the melt path 610 in lock step.

The inventors' apparatus, systems, and methods produce a power map that describes laser power changes as the laser beam moves along a path to create the product or part. The map shown is a fractional power versus time. The time is related to the laser's position on the build plate in time. The fractional power is a factor that multiplies the total power input to the code, to retrieve the actual power that was applied at the particular time. When the power map is adopted by an AM machine, laser power is changed appropriately to prevent defects in the product or part. The power map is specific to the metal used as well as to the geometry of the build and the scan speed. It will have to be repeated for each case. But once it is done, it can be reused.

In one embodiment the inventors' apparatus, systems, and methods uses a computer model with a feed back loop control, that dynamically changes the laser power, so as to meet a certain criterion. The criterion that was exhibited in this document pertains to tracking one tracer point that follows the laser at a given location depth in the substrate and controlling the temperature at that tracer point to be a fixed value equal to the melt temperature. In this problem, the algorithm used is based on Proportional Integral Derivative controller or PID. The PID is used to maintain a fixed temperature at a given depth. This will be imposed by the user. The PID does that by controlling the power to achieve the desired fixed temperature at the desired melt pool depth. A computer model is used to generate the appropriate power to maintain a constant temperature at the tracer point. In this case, the melting temperature of stainless steel was imposed at that point, so as to control the melt pool depth. Referring to FIGS. 9A and 9B, additional illustrations show examples of how spattering can occur as the laser beams travels over the powder bed. The components of FIGS. 9A and 9B are listed below.
900a example of the laser beam in a perpendicular position relative to the powder bed,
900b example of the laser beam in a position at an angle relative to the powder bed,
902 substrate,
904 powder bed,
906 laser beam,
908 melt pool,
910 plume,
912 spatter, and
914 angle.

FIG. 9A is a cross sectional view showing spattering when the laser beam 906 is in a perpendicular position relative to the powder bed. The example of the laser beam in a perpendicular position relative to the powder bed is designated generally by the reference numeral 900a. FIG. 9A shows that the ejected (spatter) particles 912 can fall and contaminate other parts of the powder bed 904.

FIG. 9B shows an example of the laser beam in a position at an angle relative to the powder bed. FIG. 9B shows the laser beam 906 in a position at an angle 914 relative to the powder bed 904. A proportional-integral-derivative (PID) loop controller can be used to set the plume at a given tilted angle. The pid controller would control the power and/or scan speed to maintain the tilted plume. The setup would include a camera like a Schlieren or infrared camera or any other imaging tool that measures the inclination of the spatter and the plume and feeds that information to the PID controller, which then controls the power or laser scan speed. When the melt pool is close to the keyhole regime, the melt pool is deep, and the plume has a vertical direction. When the melt pool is not deep but instead, the front of it is less inclined, the plume exits the melt pool at an angle. It is the plume's direction that determines the direction of spatter. So, by controlling the inclination, therefore the plume direction, one can control the spatter direction. Controlling the plume entails controlling the power and scan speed.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of numerical methods, reduced order models, machine learning models based on neural networks for example, diagnostic apparatus such as XRays or pyrometers, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. For instance, the PID controller could be coupled to an actual AM machine and controlling AM parameters while monitoring variables such as depth provided by Xrays or temperature provided by pyrometers, or machine learning models. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A laser powder bed fusion additive manufacturing method for producing a product and reducing spattering, comprising the steps of:
   providing a build platform;
   providing a powder bed on said build platform;
   providing metal powder in said powder bed;
   providing a laser having a first laser beam and a second laser beam, wherein the first laser beam has a first spot size and a first power and wherein the second laser beam has a second spot size and a second power, wherein said second spot size is smaller than said first spot size;
   providing a proportional-integral-derivative controller;
   providing an infrared camera;
   creating a power map to control said laser to produce said first laser beam directed to said metal powder and produce said second laser beam directed to said metal powder;
   partially melting said metal powder by said first laser beam before fully melting said metal powder by application of additional energy from said second laser beam;
   wherein, when said metal powder is fully melted by said second laser beam, a plume of spatter is produced at an angle relative to powder bed;
   monitoring said angle of plume of spatter with said infrared camera; and
   maintaining said angle of plume of spatter at a predetermined angle by using said proportional-integral-derivative controller.

2. The laser powder bed fusion additive manufacturing method for producing a product and reducing spattering of claim 1, further comprising:
   a step of starting said second laser beam at an initial power and, after an interval, increasing the power of the second laser beam.

3. The laser powder bed fusion additive manufacturing method for producing a product and reducing spattering of claim 1, further comprising:
   a step of directing said first laser beam and said second laser beam on a path on said powder bed, and
   wherein said step of creating a power map includes a step of creating a tracer point in a computer model and using said tracer point to direct said first laser beam and said second laser beam on said path on said powder bed.

4. The laser powder bed fusion additive manufacturing method for producing a product and reducing spattering of claim 1, further comprising:

a step of using a computational model with a feedback loop control that changes the laser's first and second beams to tracking one tracer point that follows the laser's first and second beams at a given location depth and controls the temperature at said one tracer point to a fixed value equal to the melt temperature of the metal powder.

\* \* \* \* \*